United States Patent [19]

Maryscuk et al.

[11] 3,909,540

[45] Sept. 30, 1975

[54] DATA AND SIGNALING MULTIPLEXING IN PCM SYSTEMS VIA THE FRAMING CODE

[75] Inventors: Thomas Paul Maryscuk; Lehman Holson Johnson, III, both of Raleigh, N.C.

[73] Assignee: International Telephone and Telegraph Corporation, Nutley, N.J.

[22] Filed: Sept. 3, 1974

[21] Appl. No.: 503,014

[52] U.S. Cl. .......................... 179/15 BY; 179/15 BS

[51] Int. Cl.[2] .......................... H04J 3/12; H04J 3/06

[58] Field of Search .......... 179/15 BY, 15 A, 15 BS; 325/4

[56] References Cited

UNITED STATES PATENTS

| | | | |
|---|---|---|---|
| 3,542,957 | 11/1970 | Mitchell | 179/15 BY |
| 3,689,699 | 9/1972 | Brenig | 179/15 BS |
| 3,772,475 | 11/1973 | Loffreda | 179/15 BY |
| 3,821,478 | 6/1974 | Hillman | 179/15 AF |

*Primary Examiner*—David L. Stewart
*Attorney, Agent, or Firm*—John T. O'Halloran; Menotti J. Lombardi, Jr.; Alfred C. Hill

[57] ABSTRACT

A subsystem is added to an existing PCM system to provide N additional data channels and to increase the number of signaling channels. The subsystem includes a framing code generator to produce a framing code having a data code bit position for each of 6N system frames with certain of the bit positions having a distinctive pattern of code bits to provide frame synchronization for the receiver of the existing system and the receiving portion of the subsystem. The N additional data channels are time multiplexed by timing signals from the frame code generator and then the frame code generator inserts each channel of N time multiplexed channels into a different one of N others of the code bit positions to convey the additional data in the framing code without altering the distinctive pattern of code bits. The framing code generator also provides other timing signals to increase the number of signaling channels. A framing code receiver of the subsystem recovers the additional data channels from the framing code, the additional signaling channels and synchronizes the system and subsystem in response to the distinctive pattern of code bits. The subsystem may be converted to Western Electric D2/D3 compatibility by opening a strap on each of the framing code generator and framing code receiver.

25 Claims, 18 Drawing Figures

FIG. 1

| FRAME NO. | 1 | 2 | 3 | 4 | 5 | 6 | 7 | 8 | 9 | 10 | 11 | 12 |
|---|---|---|---|---|---|---|---|---|---|---|---|---|
| FRAMING CODE | 1 | | 0 | | 1 | | 0 | | 1 | | 0 | |
| SIGNALING CODE | | 0 | | 0 | | 1 | | 1 | | 1 | | 0 |
| COMBINED CODE | 1 | 0 | 0 | 0 | 1 | 1 | 0 | 1 | 1 | 1 | 0 | 0 |

FIG. 2

| FRAME NO. | 1 | 2 | 3 | 4 | 5 | 6 | 7 | 8 | 9 | 10 | 11 | 12 |
|---|---|---|---|---|---|---|---|---|---|---|---|---|
| FRAMING & DATA CODE | 1 | X | 0 | 0 | 1 | X | 0 | 1 | 1 | 1 | 0 | 0 |
| | | DATA BIT, CHANNEL 1 | | | | DATA BIT, CHANNEL 2 | | | | SUPER FRAME BIT, SUPER FRAME 1 | | |
| FRAME NO. | 13 | 14 | 15 | 16 | 17 | 18 | 19 | 20 | 21 | 22 | 23 | 24 |
| FRAMING & DATA CODE | 1 | X | 0 | 0 | 1 | X | 0 | 1 | 1 | 0 | 0 | 0 |
| | | DATA BIT, CHANNEL 3 | | | | DATA BIT, CHANNEL 4 | | | | SUPER FRAME BIT, SUPER FRAME 2 | | |
| FRAME NO. | 25 | 26 | 27 | 28 | 29 | 30 | 31 | 32 | 33 | 34 | 35 | 36 |
| FRAMING & DATA CODE | 1 | X | 0 | 0 | 1 | X | 0 | 1 | 1 | 0 | 0 | 0 |
| | | DATA BIT, CHANNEL 5 | | | | DATA BIT, CHANNEL 6 | | | | SUPER FRAME BIT, SUPER FRAME 3 | | |
| FRAME NO. | 37 | 38 | 39 | 40 | 41 | 42 | 43 | 44 | 45 | 46 | 47 | 48 |
| FRAMING & DATA CODE | 1 | X | 0 | 0 | 1 | X | 0 | 1 | 1 | 0 | 0 | 0 |
| | | DATA BIT, CHANNEL 7 | | | | DATA BIT, CHANNEL 8 | | | | SUPER FRAME BIT, SUPER FRAME 4 | | |

FIG. 5

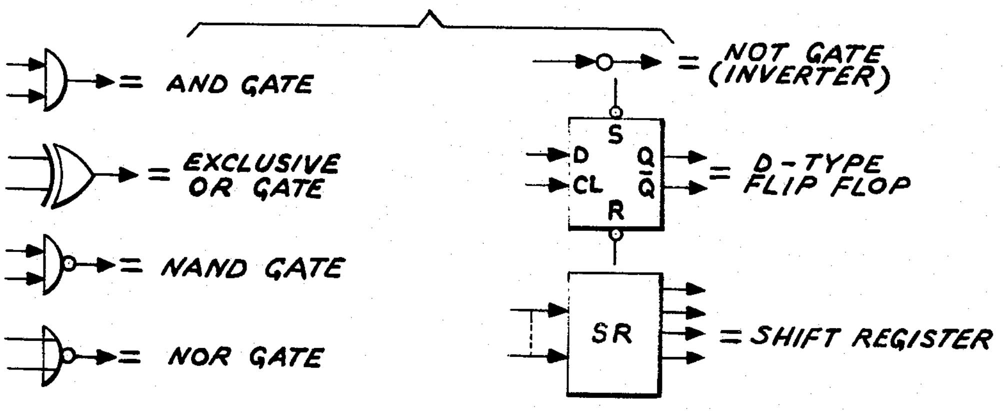

DATA AND SIGNALING MULTIPLEXING IN PCM SYSTEMS VIA THE FRAMING CODE

BACKGROUND OF THE INVENTION

This invention relates to pulse code modulation (PCM) communication systems and more particularly to an arrangement employed in such systems to provide additional signaling and data channels.

In the prior art additional data channels have been obtained by employing unused signaling channels which require that certain channel types must be used in assigned time positions.

In the prior art extra signaling channels are provided by using unused signaling channels of another channel type for the channels required, requiring the two channels to be connected and used together. In addition, extra signaling channels can be provided by sending in-band and out-of-band signals on voice frequency channels. Still another technique for providing extra signaling channels is to send tones on the signaling channels.

The shortcomings of the above-mentioned arrangements and techniques are that by sending data on unused signaling channels the number of channel types in any position was reduced since certain channel types had to be used in the positions assigned as data channels and thereby limiting the number of channel types that can be used in one system. The use of an unused signaling channel by other signaling channels has the same restriction. Sending tones for extra signaling channels requires expensive detecting circuitry.

It should also be noted that in the foregoing prior art arrangements and techniques the increase of signaling channels is obtained by reducing the number of data channels available and the increase of data channels employing signaling channels reduces the number of signaling channels available.

SUMMARY OF THE INVENTION

An object of the present invention is to provide a subsystem which may be added to an existing pulse code modulation time multiplex system to obtain both additional data channels and signaling channels in a manner overcoming the above-mentioned shortcomings of the prior art arrangements and techniques.

A feature of the present invention is the provision, in a pulse code modulation time multiplexed system including a transmitter and a receiver, the system having a first given number of data channels and a second given number of signaling channels per frame, of a subsystem added to the system to provide at least N additional data channels, where N is an integer greater than one, comprising: N sources of additional data; a transmitter portion including first means coupled to the N sources to time multiplex the additional data of the N sources into N time multiplexed channels; and second means coupled to the first means, the second means providing at least one timing signal coupled to the first means to control the multiplexing of the additional data of the N sources, producing a framing code having a code bit position for each of 6N system frames, certain of the code bit positions having a distinctive pattern of code bits to provide frame synchronization, receiving the N time multiplexed channels from the first means and inserting each channel of the N time multiplexed channels into a diffeent one of N others of the code bit positions to convey the additional data in the framing code without altering the distinctive pattern of code bits; and a receive portion including third means coupled to the second means to receive the framing code, the third means recovering the N time multiplexed channels from the framing code, producing at least two timing signals and being responsive to the distinctive pattern of code bits to produce a synchronization control signal to synchronize the receiver of the system and the receiving portion; and fourth means coupled to the third means responsive to the recovered N time multiplexed channels and the two timing signals to recover the additional data of the N sources.

Another feature of the present invention is the provision, in a pulse code modulation time multiplexed transmitter having a first given number of data channels and a second given number of signaling channels per frame, of a subsystem added to the transmitter to provide at least N additional data channels, where N is an integer greater than one, comprising: N sources of additional data; first means coupled to the N sources to time multiplex the additional data of the N sources into N time multiplexed channels; and second means coupled to the first means, the second means producing at least one timing signal coupled to the first means to control the multiplexing of the additional data of the N sources, producing a framing code having a code bit position for each of 6N transmitter frames, certain of the code bit positions having a distinctive pattern of code bits to provide frame synchronization, receiving the N time multiplexed channels from the first means and inserting each channel of the N time multiplexed channels into a different one of N others of the code bit positions to transmit the additional data in the framing code without altering the distinctive pattern of code bits.

A further feature of the present invention is the provision, in a pulse code modulation time multiplexed receiver having a given number of data channels and a second given number of signaling channels per frame, of a subsystem added to the receiver responding to a framing code having a code bit position for each of 6N receiver frames, certain of the bit positions having a distinctive pattern of code bits to provide frame synchronization, and N others of the code bit positions conveying N additional data, where N is an integer greater than one, the subsystem comprising: first means to receive the framing code, to recover the N additional data from the framing code, to produce at least two timing signals and to respond to the distinctive pattern of code bits to produce a synchronization control signal to synchronize the receiver and the subsystem; and second means coupled to the first means responsive to the two timing signals and the recovered N additional data to demultiplex the recovered N additional data.

BRIEF DESCRIPTION OF THE DRAWING

The above-mentioned and other features and objects of this invention will become more apparent by reference to the following description taken in conjunction with the accompanying drawing, in which:

FIG. 1 illustrates the Western Electric D2/D3 framing code which in accordance with the principles of the present invention may be employed to transmit two additional data channels;

FIG. 2 is a framing code derived from the framing code of FIG. 1 to provide eight additional data channels in accordance with the principles of the present invention;

FIG. 5 illustrates the definition of logic symbols employed in FIGS. 6, 7, 13, 16, 17 and 18;

DESCRIPTION OF THE PREFERRED EMBODIMENT

In accordance with the principles of the present invention, additional data is conveyed by the framing code of the existing system which as unused bits that can be used to transmit various data channels and multiplex information to allow the data to be multiplexed. This allows data to be transmitted without interrupting the use of signaling channels and also allows the signaling channels to be expanded up to four. This allows the equipment to be filled with any type of channels with no restrictions and to be operated over the same T-1 type line as before addition of the subassembly to an existing system. The subassembly of this invention enables the conversion to Western Electric D2/D3 compatibility by opening a strap on each of the transmit portion and receive portion of the subassembly.

The subsystem of the present invention may be added to an ITT T324 Pulse Code Modulated Cable Carrier System, wich is Western Electric D2/D3 PCM channel compatible, to be converted into an ITT 324S Subscriber PCM Cable Carrier System.

Referring to FIG. 1 there is illustrated threin the D2/D3 Western Electric framing code. The bits of certain system frames can be used for sending additional data and still allow the framing code to be unique. For instance, the bit for frames 2, 6 and 10 can be used for sending data and still allow the framing code to be unique so that it can be employed for framing and signaling information. By employing the framing code of FIG. 1 the framing code of FIG. 2 was derived and expanded to 48 frame bits allowing for a super frame channel and eight data channels as illustrated in FIG. 2.

Figure 3:
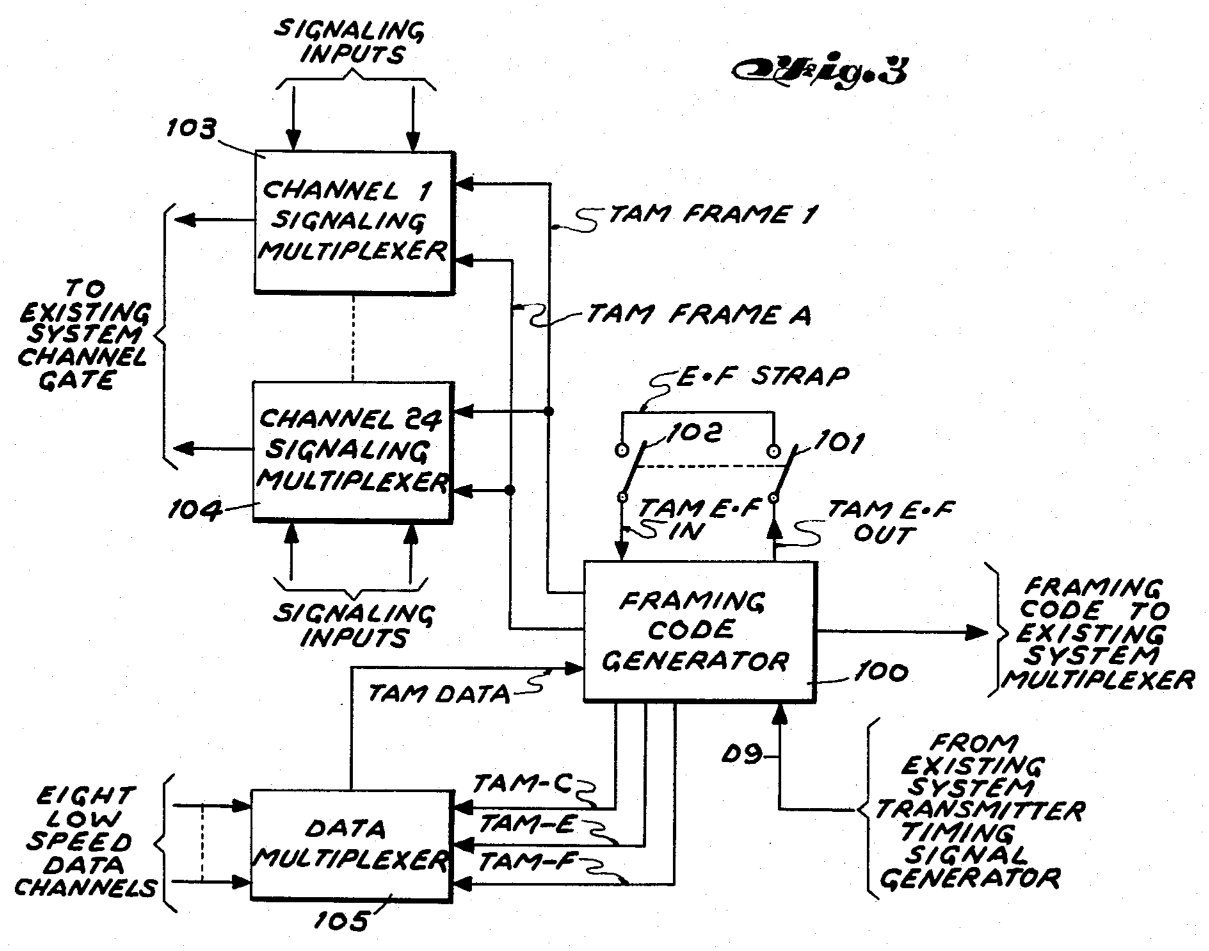
FIG. 3 is a block diagram of the transmit portion of the subsystem in accordance with the principles of the present invention.

Referring to FIG. 3, there is illustrated therein a block diagram of the transmit portion of the subsystem in accordance with the principles of the present invention. The transmit portion includes a framing code generator 100 which produces the standard Western Electric D2/D3 framing code when the E · F strap is opened by the illustrated position of switches 101 and 102. When the E · F strap is placed in operation by switches 101 and 102 framing code generator 100 will produce the super frame code of FIG. 2. Generator 100 produces TAM FRAME 1 and TAM FRAME A timing signals which multiplex two existing signaling channels into four channels via channel signaling multiplexers 103 and 104. Generator 100 also receives TAM DATA input of the additional data which data has been multiplexed together in the eight data channel multiplexer 105 under control of the TAM-C, TAM-E and TAM-F timing multiplex signals and inserts each of the channels of the time multiplexed channels into the framing code of FIG. 2 as illustrated.

Figures 4, 6, 10:
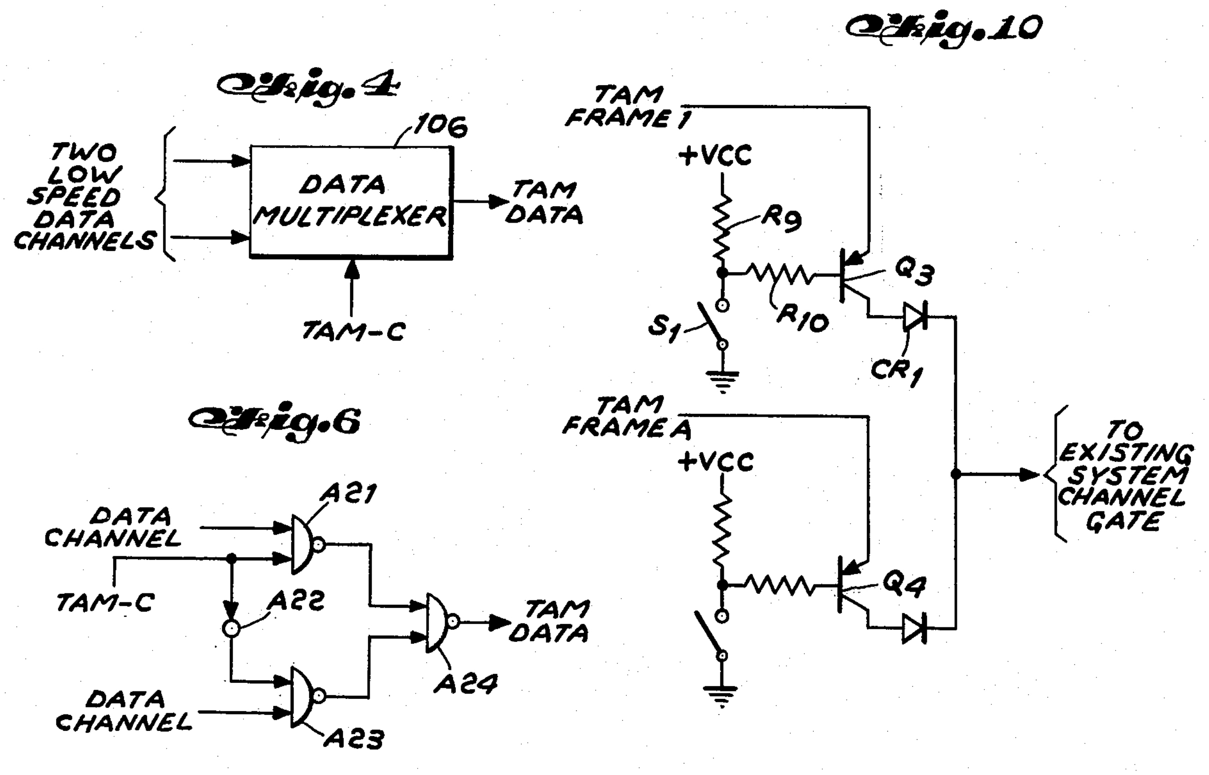
FIG. 4 is a block diagram of a two channel data multiplexer that may be substituted for the eight channel data multiplexer of FIG. 2.
FIG. 6 is a logic diagram of the two channel data multiplexer of FIG. 4.
FIG. 10 is a schematic diagram of a channel signaling multiplexer of FIG. 3.

To provide an arrangement having only two additional data channels the data multiplexer 106 of FIG. 4 may be substituted for the data multiplexer 105 of FIG. 3.

The multiplexer 105 may be implemented by a single eight input integrated circuit multiplexer unit which may be obtained from many different integrated circuit manufacturers, such as Texas Instruments, Inc.

FIG. 6 illustrates the logic diagram of the multiplexer 106 of FIG. 4. NAND gate A21 gates in one channel under control of $\overline{\text{TAM-C}}$. NAND gate A23 gates in the other data channel under control of TAM-C which appears at the output of NOT gate A22. NAND gate A24 multiplexes the two signals into a single data time multiplexed channel.

Figure 7:
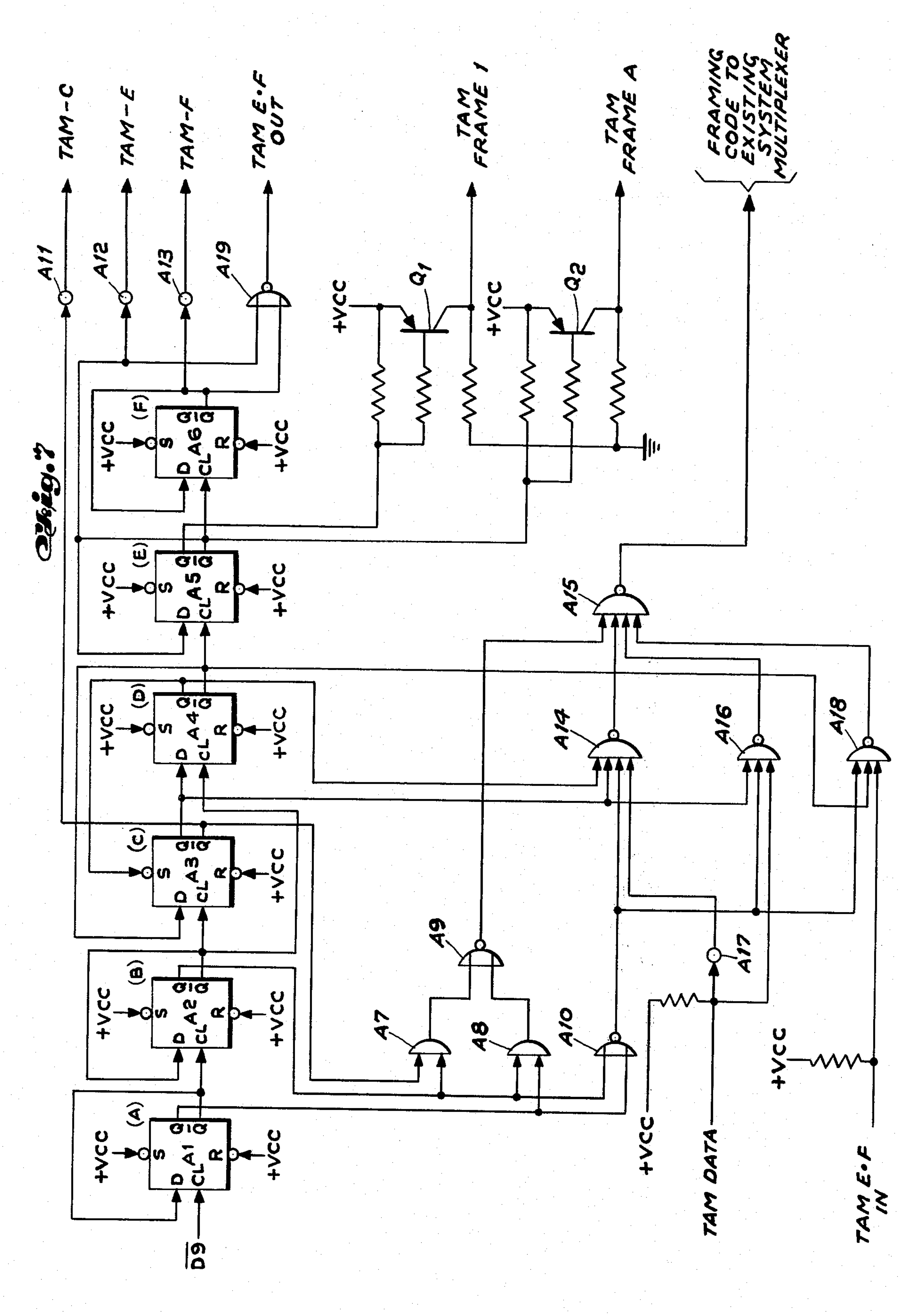
FIG. 7 is a logic diagram of the framing code generator of FIG. 3.
Figure 8:
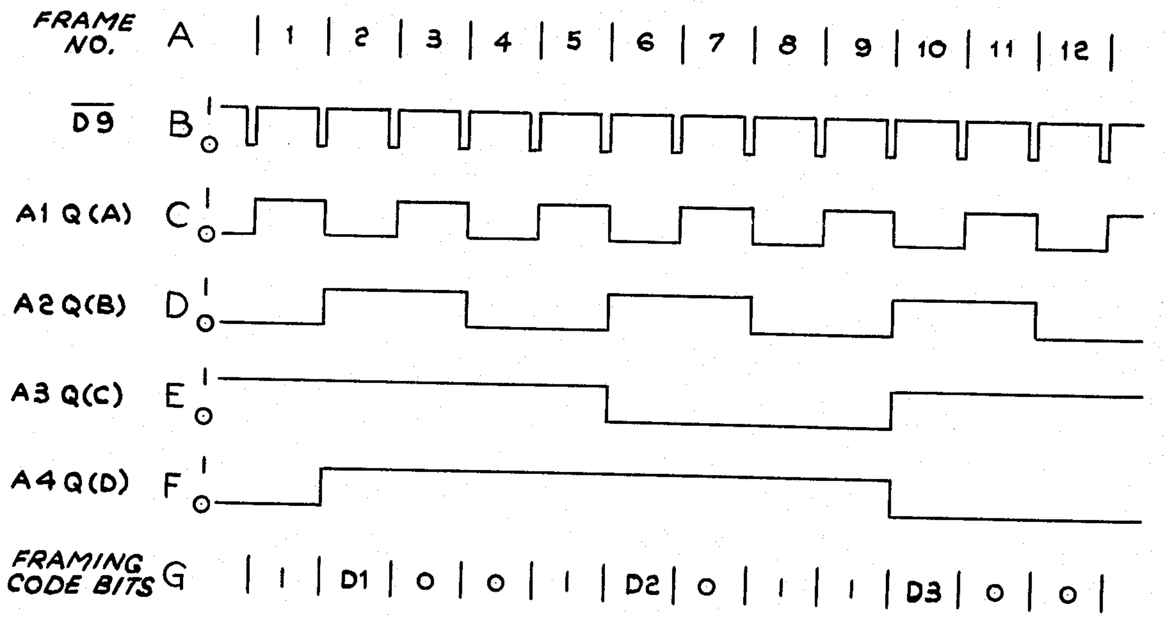
FIG. 8 is a timing diagram for the transmit frame timing.

Referring to FIG. 7 there is illustrated therein the logic diagram of framing code generator 100 of FIG. 3. D-type flip-flops A1, A2, A3, A4, A5 and A6 make up a MOD 48 counter. This counter is clocked by a signal D9 produced in the existing system timing signal generator and which marks the end of each system frame. FIG. 8 illustrates the timing of signal $\overline{\text{D9}}$ and flip-flops A1, A2, A3 and A4 and the resultant framing code that is produced at the times illustrated. With reference to FIG. 2, the D1 time is frame number 2, 14, 26 and 38, D2 time is frame number 6, 18, 30 and 42 and D3 time is the super frame bit and occurs in frame numbers 10, 22, 34 and 46. To restore the framing code to the D2/D3 frame code of FIG. 1, D1 time must go to binary 0, D2 time to a binary 1 and D3 time to a binary 1. Assigning the Q outputs of flip-flops A1–A6 the following letters, A1 = A, A2 = B, A3 = C, A4 = D, A5 = E, and A6 = F. The framing code becomes $(B \cdot \overline{C}) + (A \cdot B) + (\overline{A} \cdot \overline{B} \cdot C \cdot D \cdot D1) + (\overline{A} \cdot \overline{B} \cdot \overline{C} \cdot D2) + (\overline{A} \cdot \overline{B} \cdot \overline{D} \cdot D3)$. AND gate A7 produces $B \cdot \overline{C}$ data. AND gate A8 produces $A \cdot B$ data. NOR gate A9 produces $\overline{(A \cdot B) + (B \cdot \overline{C})}$ data. NOR gate A10 produces $\overline{A} \cdot \overline{B}$ data. NAND gate A14 produces $\overline{\overline{A} \cdot \overline{B} \cdot C \cdot D}$. NAND gate A16 produces $\overline{A} \cdot \overline{B} \cdot \overline{C}$ data. NAND gate A18 produces $\overline{A} \cdot \overline{B} \cdot \overline{D}$ (E · F). Substituting $\overline{\text{data}}$ for D1 and data for D2 and (E · F) for D3 the output of NAND gate A15 is the above equation for the framing code. When the TAM data input is open and the (E · F) strap is open, $D1 = \overline{data} = 0$, $D2 = data = 1$ and $D3 = E \cdot F = 1$. Thus, for these conditions the D2/D3 type framing code is produced as illustrated in FIG. 1.

Figure 9:
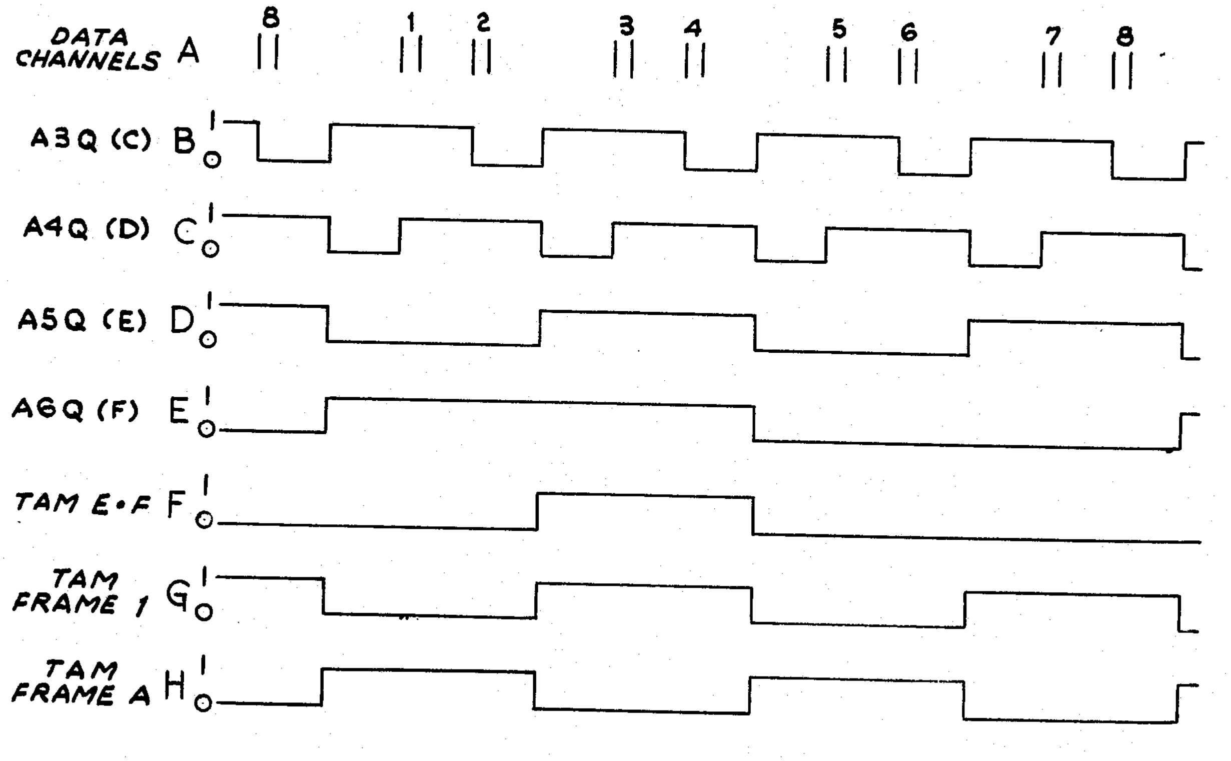
FIG. 9 is a timing diagram of the transmit data multiplex timing.

FIG. 9 illustrates the timing diagram for data multiplex timing accomplished by flip-flops A3, A4, A5 and A6. These timing signals are used to multiplex the data channel and the multiplexed data is inputed to the TAM DATA input of FIG. 7. The TAM E · F output shown in FIG. 7 is the signal connected to TAM E · F in and the signal that creates the super frame bits of FIG. 2. Signals TAM FRAME 1 and TAM FRAME A are used to multiplex the existing signaling channels used by the channel units to increase the number of signaling channels available.

FIG. 10 is a schematic diagram of one of the multiplexers 103 or 104 of FIG. 3. Transistor Q3 has its base controlled by switch S1 via pull-up resistor R9 and limiting resistor R10. When switch S1 is closed and TAM FRAME 1 signal goes to voltage VCC, current passes through transistor Q3 and diode CR1 into the existing channel gate of the system. When switch S1 is open, transistor Q3 will not conduct when the TAM FRAME 1 signal goes high. The second part of the circuit of FIG. 10 including transistor Q4 operates in the same manner when TAM FRAME A signal goes high.

Figure 11:
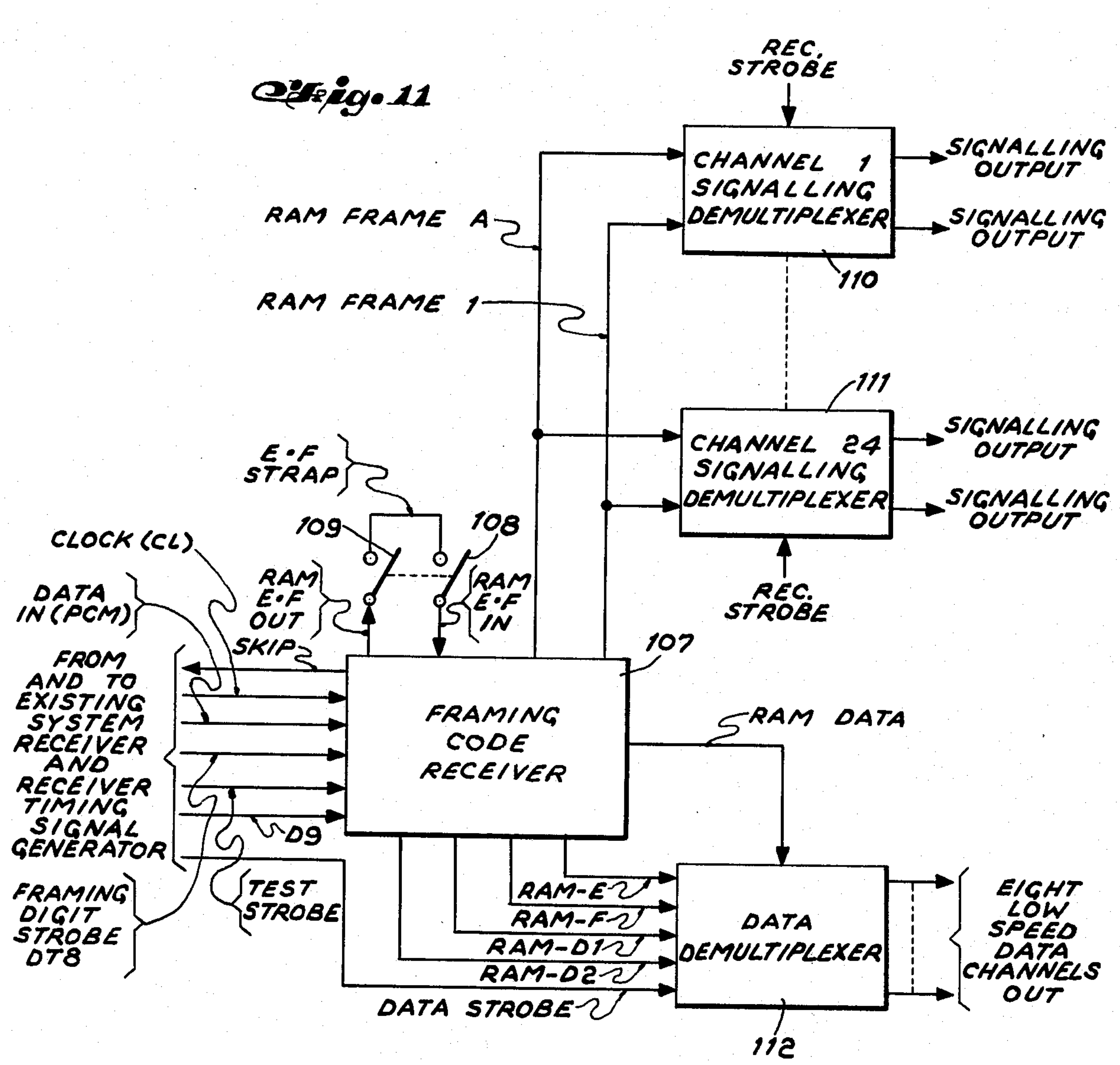
FIG. 11 is a block diagram of the receive portion of the subsystem in accordance with the principles of the present invention.

FIG. 11 illustrates a block diagram of the receive portion of the subsystem in accordance with the principles of the present invention. The framing code receiver 107 receives the full code transmitted, namely, the framing code and voice code, locates and synchronizes its counters to the incoming framing code. When the E · F strap is open as illustrated by switches 108 and 109, receiver 107 synchronizes to the standard Western Electric D2/D3 framing code. When the E · F strap is in place by closing switches 108 and 109, receiver 107 synchronizes to the super frame code of FIG. 2 and separates the additional data channels from the framing code of FIG. 2 and supplies the demultiplexing signals for the additional data channels. Receiver Receiver 107 also produces the demultiplexing timing signals for the channel signaling demultiplexers 110 and 111 which demultiplexes the signaling channels. Data demultiplexer 112 is an eight channel demultiplexer and demultiplexes the additional data channels in the framing code of FIG. 2. By substituting the data demultiplexer 113 of FIG. 2 for the data demultiplexer 112 of FIG. 11 the two additional data channels in the framing code can be demultiplexed.

Figure 13:
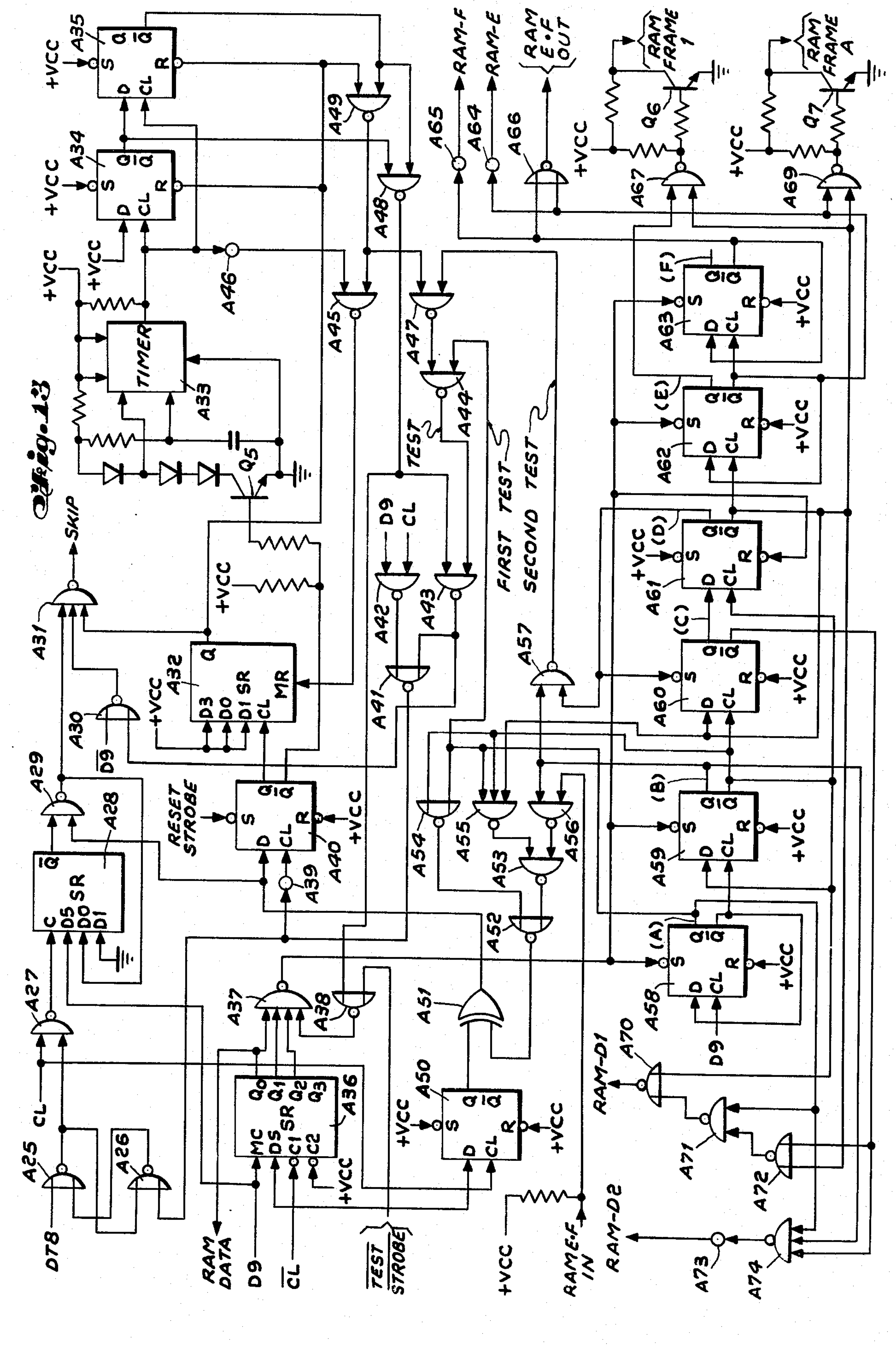
FIG. 13 is a logic diagram of the framing code receiver of FIG. 11.

FIG. 13 is the logic diagram of framing code receiver 107 of FIG. 11. The logic diagram produces a framing code and compares it with the incoming framing code. When eight errors are received in 20 milliseconds, the system and subsystem is considered out of synchronization and resynchronizes itself by first finding odd numbered frame bits of the framing code and then locating the three consecutive binary 1 pattern of frames 8, 9 and 10 as shown in FIG. 2.

After finding the three 1's the receiver sets the main counter in synchronism with the received framing code, then it tests all of the code bit positions except for the bits of frames 2 and 4. When the system and subsystem is out of synchronization framing, receiver 107 produces a SKIP signal for coupling to the existing system to cause the existing system timing signal generator to skip clock pulses until a bit is found by receiver 107 that appears to be the framing bit. The main counter of receiver 107 as shown in FIG. 13 is a Mod 48 counter, like the counter in the transmitting portion of the subsystem and is made up of D-type flip-flops A58, A59, A60, A61, A62 and A63.

Figure 14:
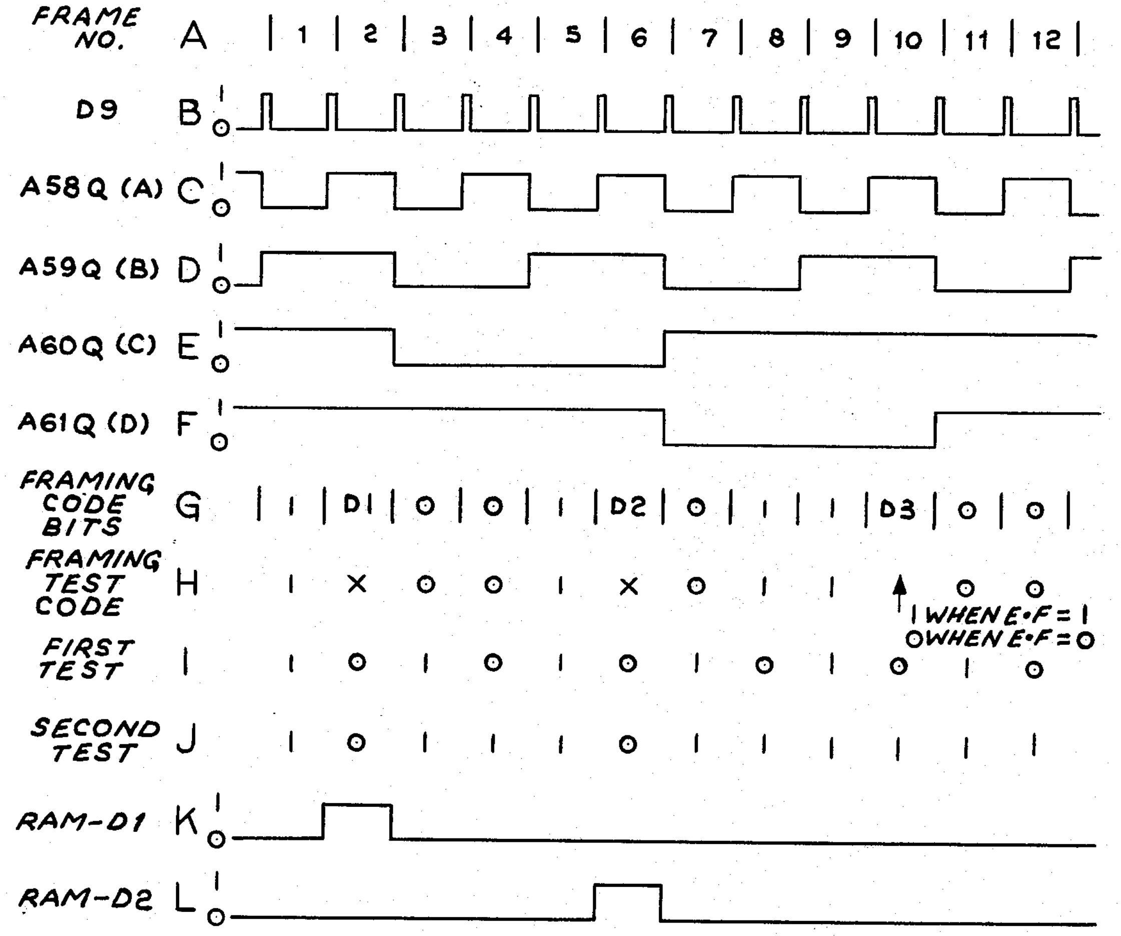
FIG. 14 is a timing diagram of the receive framing code timing.

FIG. 14 shows the timing signals of flip-flops A58, A59, A60 and A61. The counter is clocked by the D9 signal which is supplied by the timing signal generator of the existing system at the end of each frame. The framing test code shown in Curve H, FIG. 14 is $(\overline{A} \cdot B) + (A \cdot \overline{B} \cdot \overline{D}) + (B \cdot E \cdot F)$. NOR gate A54 produces A · B data. NAND gate A55 produces $\overline{A \cdot \overline{B} \cdot \overline{D}}$ data. NAND gate A56 produces B · E · F data. NAND gate A 53 produces $(A \cdot \overline{B} \cdot \overline{D}) + (B \cdot E \cdot F)$ data. NOR gate A52 produces $\overline{(\overline{A} \cdot B) + (A \cdot \overline{B} \cdot \overline{D}) + (B \cdot E \cdot F)}$ which is the above-identified framing test code inverted. The first test code is A which is supplied to NAND gate A44. Gate A44 OR's the second test code in when NAND gate A47 is armed. NAND gate 57 produces an output of $D + \overline{B}$ which is ORed by gate A44 to produce the second framing code, TEST.

The received data (PCM) including both the framing code and the voice code is clocked into D-type flip-flop A50. The received data is compared to the framing test code by EXCLUSIVE OR gate A51. The output of gate A51 is high when the received data is the same as the test code. The signal is applied to NAND gate A29 and D-type flip-flop A40. The second framing code TEST is applied to NAND gate A43 which is normally armed. NAND gate A42 produces an output of $\overline{CL \cdot D9}$. This signal is ANDed by NOR gate A41 with the second framing code TEST. The output of gate A41 is inverted by NOT gate A39 and strobes the output of gate A51 into flip-flop A40. Every time an error is received, flip-flop A40 clocks a 1 into the eight bit shift register A32. The $\overline{Q}$ output of flip-flop A40 is coupled to transistor Q5 which resets the error rate timer A33 and its associated circuitry. The error flip-flop A40 is reset before the next test signal by a reset strobe from the timing signal generator of the existing system. When eight errors are recorded in register A32 the output thereof goes high, arming the SKIP signal NAND gate A31 and releasing the reset of flip-flops A34 and A35 which determine how the code is tested. The output of register A32 is also applied to NAND gate A49 whose output goes low disarming NAND gates A45 and A47. Gate A45 prevents shift register A32 from restting while the first two steps of the framing cycle are taking place. Gate A47 prevents the second test code from being added to the first test code. The first test code is tested every other frame for the framing code. Each time the framing bit time is present, $\overline{D9}$ goes low which is ANDed with the second framing code TEST by NOR gate A30. The output of gate A30 also arms gate A31. The received signal and the first eight bits and the previously received signal are compared by NAND gate A29. If eight bits are not the same polarity as the framing bit, the output of gate A29 will be low causing the output of gate A31 to go low causing the existing time signal generator of the existing system to slip one bit at a time. When an assumed good bit is found, the SKIP signal goes high and the D9 signal goes high stopping the search for that frame. Each time the signal is tested, the flip-flop including NOR gates A25 and A22 is set. Eight digits after the frame is found, the DT8 signal resets the flip-flop including NOR gates A25 and A26. When this flip-flop is set, NAND gate A27 is armed and the clock signal CL passes through gate A27 to clock shift register A28. This register has the last tested framing bit in it and the next seven bits received. The output of register A28 is compared by gate A29 to the new data and the output is applied to the SKIP gate A31 and back to the input of register A28. The output of register A28 goes high when it is emptied of all its bits. When a bit is found signal D9 goes low allowing register A28 to accept the framing bit and the next seven bits. This provides an eight bit look ahead circuit. When the framing pattern is found no errors are received so that timer A33 produces a pulse which clocks flip-flops A34 and A35. The output of flip-flop A34 goes high. With flip-flop A34 set and flip-flop A35 reset, the output of NOR gate A38 is low disarming gate A43 so that no test signal is produced. At the same time the output of gate A48 arms gate A38. Each framing code bit is shifted into shift register A36, when signal D9 is high and clock signal CL goes low. When the three 1's pattern is shifted into shift register A36, its outputs Q0 – Q2 go high and when the test strobe is applied to gate A38, its output goes high. All of these signals are applied to NAND gate A37 and its output goes low setting the Mod-48 counter into proper count in synchronism with the received framing code. The error counter, in the form of timer A33, is free-running and will time out, pulsing out another clock pulse to flip-flops A34 and A35. Flip-flop A34 is set and flip-flop A35 is set. This sets the output of NAND gate A49 high arming NAND gate A45 allowing the next error counter pulse to pass and gate A47 allowing the second test signal to be formed. The output of gate A48 goes high arming gate A43 so that the second TEST signal will pass starting the second test and also the output of gate A48 disarms gate A38 preventing the Mod 48 counter from being reset again. If the error rate remains low, the error rate counter pulses in another pulse which is inverted by NOT gate A46 and will pass gate A45 and resets the error shift register A32. The output of register A32 disarms the SKIP signal gate A31 and resets flip-flops A34 and A35, and is applied to gate A49 to keep its output high. This leaves the error test circuits in the second test.

When the E · F strap is removed the framing test circuits test for a 1 in bit position 10 all of the time allowing the circuit to frame to the D2/D3 code.

Curves K and L of FIG. 14 shows the data strobe signals D1 and D2. Signal D1 is A · B · C · D and signal D2 is A· B · $\overline{C}$. NOR gate A72 produces C · D data. NAND gate A71 produces $\overline{A \cdot C \cdot D}$ data. NOR gate A70 produces A · $\overline{B \cdot C \cdot D}$ which is signal D1. NAND gate A74 produces A · B · $\overline{C}$ and NOT gate A73 inverts the output of gate A74 into A · B · $\overline{C}$ which is signal D2.

Figure 15:
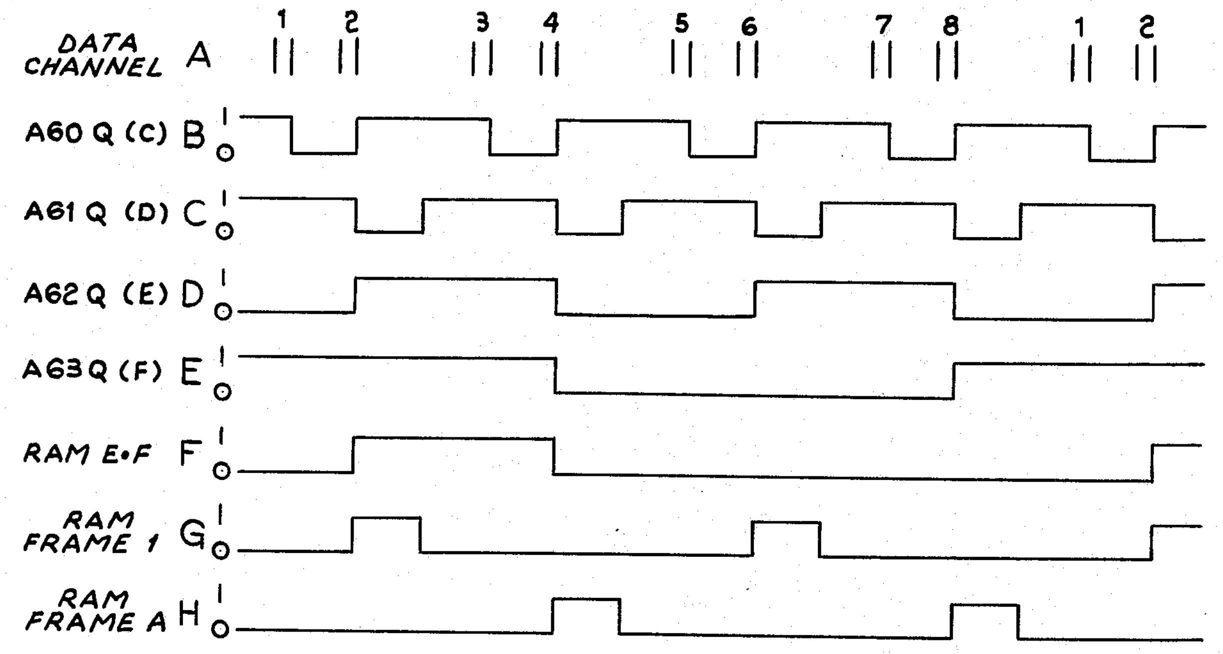
FIG. 15 is a timing diagram of the receive data timing.

FIG. 15 illustrates the timing diagram of flip-flops A60, A61, A62 and A63, which completes the Mod 48 counter. NOT gate A64 inverts $\overline{E}$ signal to form RAM-E. NOT gate A65 inverts $\overline{F}$ to form RAM-F. NOR gate A66 produces the E · F signal which is called RAM-E · F out. NAND gate A67 forms the signal $\overline{\text{RAM FRAME 1}}$ and the buffer including transistor Q6 inverts this signal to form RAM FRAME 1. NAND gate A69 and the buffer including transistor Q7 in a similar manner form the output signal RAM FRAME A.

Figure 16:
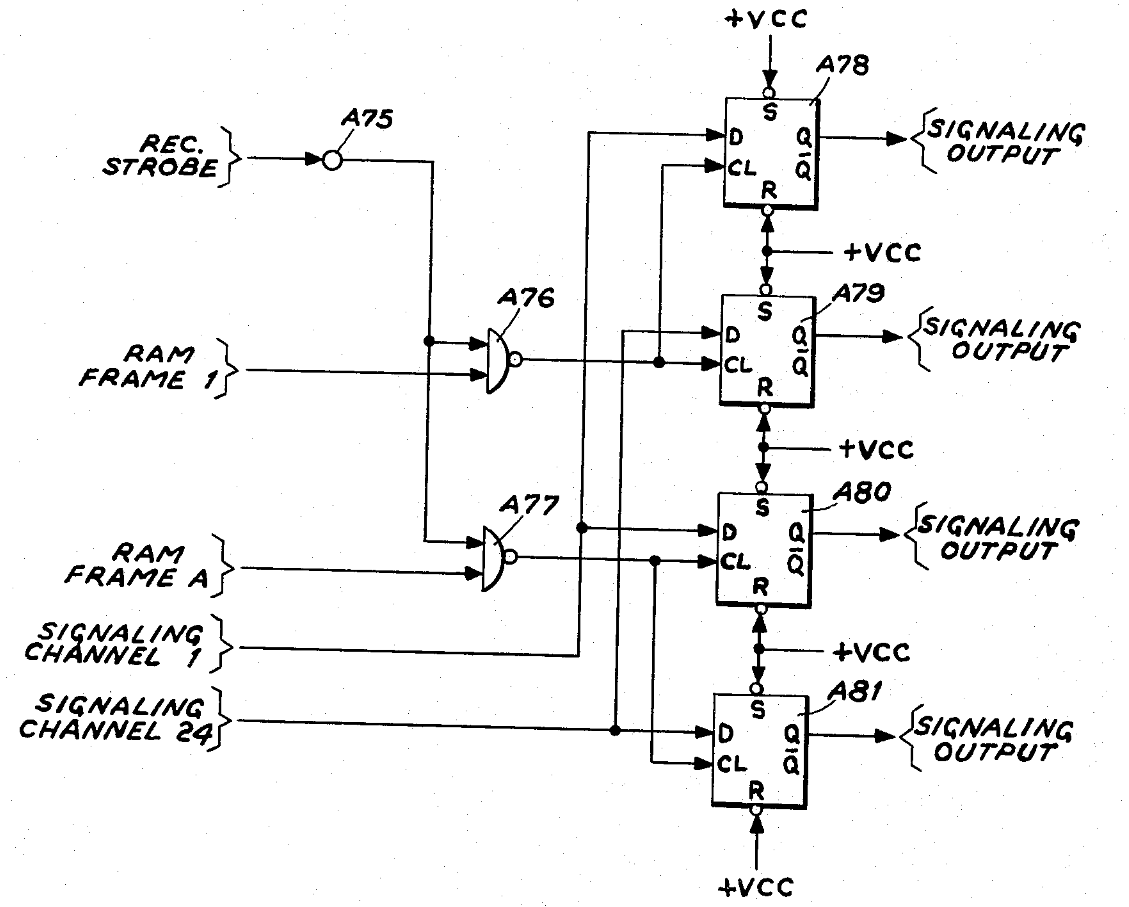
FIG. 16 is a logic diagram of a channel signaling demultiplexer of FIG. 11.

Referring to FIG. 16, there is illustrated therein the logic diagram of one of the channel signaling demultiplexers 110 and 111 of FIG. 11. The REC Strobe is the channel pulse for that channel which is present for every voice sample. This signal is inverted by NOT gate A75 and is applied to NAND gates A76 and A77. When the signaling information changes once in every 12 frames, one of the RAM FRAME signals going high and during the other 12 frames the other RAM FRAME signal goes high. While one of the RAM FRAME signals is high the REC Strobe passes one of the gates A76 or A77 and forms a clock pulse for flip-flops A78 and A79 or a clock pulse for flip-flops A80 and A81, allowing the appropriate signaling data to be stored in the flip-flops.

Figure 17:
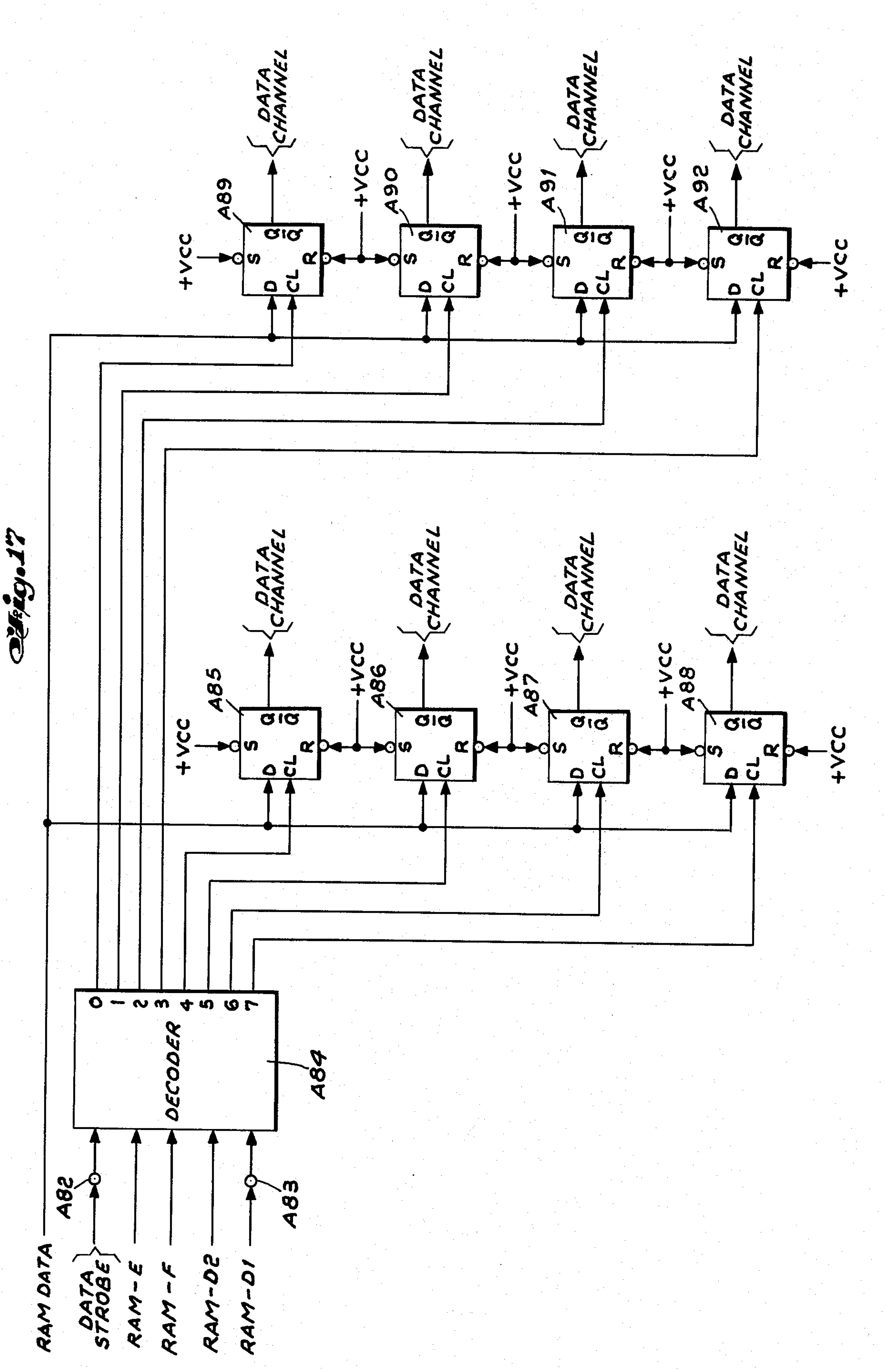
FIG. 17 is a logic diagram of the eight channel data demultiplexer of FIG. 11.

FIG. 17 is a logic diagram of the eight channel data demultiplexer 112 of FIG. 11. The RAM-E, RAM-F, RAM-D1 and RAM-D2 signals are applied to decoder A84. the RAM-D1 signal is inverted by NOT gate A83 to form $\overline{\text{RAM-D1}}$. NOT gate A82 inverts the data strobe signal, which is present in the existing system, and applies the inverted data strobe signal to decoder A84 as a strobe signal. The outputs of decoder A84 are strobe signals that are present during the time that each data bit is present in the RAM DATA signal. Each D-type flip-flop A85 – A92 is strobed by the outputs of decoder A84 and stores its assigned bit each super frame.

Figure 12:
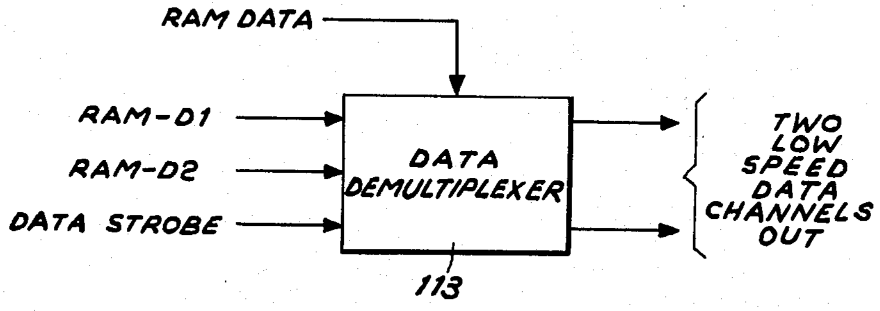
FIG. 12 is a two channel data demultiplexer that may be substituted for the eight channel data demultiplexer of FIG. 11.
Figure 18:
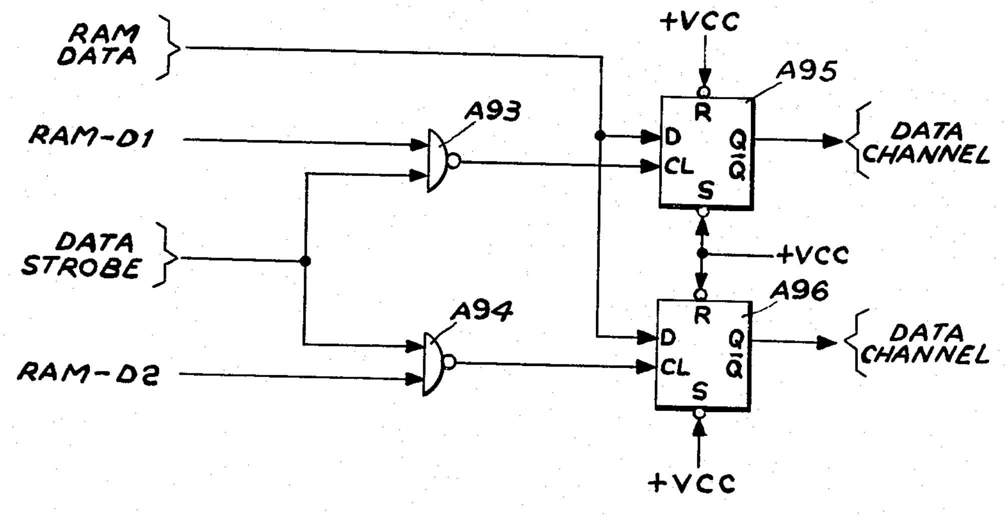
FIG. 18 is a logic diagram of the two channel data multiplexer of FIG. 12.

FIG. 18 illustrates a logic diagram of the data demulitplexer 113 of FIG. 12. The data strobe signal strobes the RAM-D1 and RAM-D2 signals through NAND gates A93 and A94, respectively. These gates supply strobe signals to the data storage flip-flops AD5 and AD6 which store its assigned data bit each frame of the additional data frame including 12 frames of the existing PCM systems.

All of the logic gates, shift registers, decoders, D-type flip-flops and eight channel demultiplexers and the like of FIGS. 6, 7, 13, 16, 17 and 18 can be implemented by module units supplied by integrated circuit module manufacturers, such as Texas Instruments, Inc.

While we have described above the principles of our invention in connection with specific apparatus it is to be clearly understood that this description is made only by way of example and not as a limitation to the scope of our invention as set forth in the objects thereof and in the accompanying claims.

We claim:

1. In a pulse code modulation time multiplexed system including a transmitter and receiver, said system having a first given number of data channels and a second given number of signaling channels per frame, a subsystem added to said system to provide at least N additional data channels, where N is an integer greater than one, comprising:

N sources of additional data;

a transmitter portion including first means coupled to said N sources to time multiplex said additional data of said N sources into N time multiplexed channels; and second means coupled to said first means, said second means producing at least one timing signal coupled to said first means to control the multiplexing of said additional data of said N sources, producing a framing code having a code bit position for each of 6N system frames, certain of said code bit positions having a distinctive pattern of code bits to provide frame synchronization, receiving said N time multiplexed channels from said first means and inserting each channel of said N time multiplexed channels into a different one of N others of said code bit positions to convey said additional data in said framing code without altering said distinctive pattern of code bits; and a receiver portion including third means coupled to said second means to receive said framing code, said third means recovering said N time multiplexed channels from said framing code, producing at least two timing signals and being responsive to said distinctive pattern of code bits to produce a synchronization control signal to synchronize said receiver of said system and said receiving portion; and fourth means coupled to said third means responsive to said recovered N time multiplexed channels and said two timing signals to recover said additional data of said N sources.

2. A subsystem according to claim 1, wherein

N is equal to two.

3. A subsystem according to claim 2, wherein said distinctive pattern of code bits is three successive binary 1 bits in three adjacent ones of said code bit positions.

4. A subsystem according to claim 1, wherein

N is equal to eight, said second means produces three timing signals to control the multiplexing of said additional data of said N sources, and said third means produces four timing signals to recover said additional data of said N sources.

5. A subsystem according to claim 4, wherein said distinctive pattern of code bits is three successive binary 1 bits in three adjacent ones of said code bit positions within the first 12 of said code bit positions of 48 code bit positions of said framing code.

6. A subsystem according to claim 1, wherein said third means includes fifth means to produce a local framing code identical to said received framing code, sixth means coupled to said fifth means to compare said received framing code with said local framing code, seventh means coupled to said sixth means to produce an out-of-sync signal when said sixth means detects a given number of errors in a given length of time; and eighth means coupled to said seventh means responsive to said out-of-sync signal to reestablish synchronization by first finding odd numbered ones of said code bit positions of said received framing code and then locating said distinctive pattern of code bits.

7. A subsystem according to claim 6, wherein

N is equal to two, and said distinctive pattern of code bits is three successive binary 1 bits in three adjacent ones of said code bit positions.

8. A subsystem according to claim 6, wherein

N is equal to eight, and said distinctive pattern of code bits is three successive binary 1 bits in three adjacent ones of said code bit positions within the first 12 of said code bit positions of 48 code bit positions of said framing code.

9. A subsystem according to claim 1, wherein said second means further produces two additional timing signals, and further including at least two signaling multiplexers coupled to said second means, each of said signaling multiplexers responding to both of said two additional timing signals to increase the number of said signaling channels in said system.

10. A subsystem according to claim 9, wherein said third means further produces a pair of additional timing signals, and further including at least two signaling demultiplexers coupled to said third means, each of said signaling demultiplexers responding to both of said pair of additional timing signals to define channel outputs for said increased number of said signaling channels in said system.

11. In a pulse code modulation time multiplexed transmitter having a first given number of data channels and a second given number of signaling channels per frame, a subsystem added to said transmitter to provide at least N additional data channels, where N is an integer greater than one, comprising:

N sources of additional data;

first means coupled to said N sources to time multiplex said additional data of said N sources into N time multiplexed channels; and second means coupled to said first means, said second means producing at least one timing signal coupled to said first means to control the multiplexing of said additional data of said N sources, producing a framing code having a code bit position for each of 6N transmitter frames, certain of said code bit positions having a distinctive pattern of code bits to provide frame synchronization, receiving said N time multiplexed channels from said first means and inserting each channel of said N time multiplexed channels into a different one of N others of said code bit positions to transmit said additional data in said framing code without alterning said distinctive pattern of code bits.

12. A subsystem according to claim 11, wherein

N is equal to two.

13. A subsystem according to claim 12, wherein said distinctive pattern of code bits is three successive binary 1 bits in three adjacent ones of said code bit positions.

14. A subsystem according to claim 11, wherein

N is equal to eight, and said second means produces three timing signals to control the multiplexing of said additional data of said N sources.

15. A subsystem according to claim 14, wherein said distinctive pattern of code bits is three successive binary 1 bits in three adjacent ones of said code bit positions within the first 12 of said code bit positions of 48 code bit positions of said framing code.

16. A subsystem according to claim 11, wherein said second means further produces two additional timing signals, and further including at least two signaling multiplexers coupled to said second means, each of said signaling multiplexers responding to both of said two additional timing signals to increase the number of said signaling channels in said transmitter.

17. In a pulse code modulation time multiplexed receiver having a given number of data channels and a second given number of signaling channels per frame, a subsystem added to said receiver responding to a framing code having a code bit position for each of 6N receiver frames, certain of said bit positions having a distinctive pattern of code bits to provide frame synchronization, and N others of said code bit positions conveying N additional data, where N is an integer greater than one, said subsystem comprising:

first means to receive said framing code, to recover said N additional data from said framing code, to produce at least two timing signals and to respond to said distinctive pattern of code bits to produce a synchronization control signal to synchronize said receiver and said subsystem; and second means coupled to said first means responsive to said two timing signals and said recovered N additional data to demultiplex said recovered N additional data.

18. A subsystem according to claim 17, wherein N is equal to two.

19. A subsystem according to claim 18, wherein said distinctive pattern of code bits is three successive binary 1 bits in three adjacent ones of said code bit positions.

20. A subsystem according to claim 17, wherein N is equal to eight, and said first means produces four timing signals to demultiplex said recovered N additional data.

21. A subsystem according to claim 20, wherein said distinctive pattern of code bits is three successive binary 1 bits in three adjacent ones of said code bit positions within the first 12 of said code bit positions of 48 code bit positions of said framing code.

22. A subsystem according to claim 17, wherein said first means includes third means to produce a local framing code identical to said received framing code, fourth means coupled to said third means to compare said received framing code with said local framing code, fifth means coupled to said fourth means to produce an out-of-sync signal when said fourth means detects a given number of errors in a given length of time, and sixth means coupled to said fifth means responsive to said out-of-sync signal to reestablish synchronization by first finding one numbered ones of said code bit positions of said received framing code and then locating said distinctive pattern of code bits.

23. A subsystem according to claim 22, wherein N is equal to two, and said distinctive pattern of code bits is three successive binary 1 bits in three adjacent ones of said code bit position.

24. A subsystem according to claim 22, wherein N is equal to eight, and said distinctive pattern of code bits is three successive binary 1 bits in three adjacent ones of said code bit positions within the first 12 of said code bit positions of 48 code bit positions of said framing code.

25. A subsystem according to claim 22, further including an increased number of signaling channels transmitted to said receiver; and at least two signaling demultiplexers coupled to said first means; and wherein said first means further produces two additional timing signals, said two signaling demultiplexers responding to both of said two additional timing signals to define channel outputs for said increased number of signaling channels.

* * * * *